US012658603B2

(12) United States Patent
Chiang et al.

(10) Patent No.: US 12,658,603 B2
(45) Date of Patent: Jun. 16, 2026

(54) COMMUNICATION DEVICE HAVING MULTIPLE ANTENNAS, AND ALLOCATION METHOD FOR THE ANTENNAS THEREOF

(71) Applicant: Arcadyan Technology Corporation, Hsinchu City (TW)

(72) Inventors: Chih-Ming Chiang, Hsinchu County (TW); Chih-Yung Huang, Taichung City (TW)

(73) Assignee: ARCADYAN TECHNOLOGY CORPORATION, Hsinchu City (TW)

( * ) Notice: Subject to any disclaimer, the term of this patent is extended or adjusted under 35 U.S.C. 154(b) by 185 days.

(21) Appl. No.: 18/671,216

(22) Filed: May 22, 2024

(65) Prior Publication Data

US 2024/0396233 A1 Nov. 28, 2024

(30) Foreign Application Priority Data

May 24, 2023 (TW) ................................ 112119341

(51) Int. Cl.
*H01Q 21/28* (2006.01)
*H01Q 5/30* (2015.01)

(52) U.S. Cl.
CPC ............... *H01Q 21/28* (2013.01); *H01Q 5/30* (2015.01)

(58) Field of Classification Search
CPC ................................ H01Q 21/28; H01Q 5/30
See application file for complete search history.

(56) References Cited

U.S. PATENT DOCUMENTS

2018/0191421 A1 7/2018 Seo et al.

FOREIGN PATENT DOCUMENTS

| | | | |
|---|---|---|---|
| CN | 114335996 | A | 4/2022 |
| CN | 115767643 | A | 3/2023 |
| JP | 2014147060 | A | 8/2014 |
| TW | M350952 | | 2/2009 |
| TW | M382604 | | 6/2010 |
| TW | I462392 | | 11/2014 |
| TW | M596462 | | 6/2020 |
| TW | I742996 | | 10/2021 |
| WO | WO2023043559 | A1 | 3/2023 |

OTHER PUBLICATIONS

Search report issued by European Patent Office on Oct. 31, 2024.
Office Action issued by Taiwan Intellectual Property Office on May 21, 2024.

*Primary Examiner* — Graham P Smith
(74) *Attorney, Agent, or Firm* — WPAT, PC

(57) ABSTRACT

A communication device with multiple antennas is provided, which includes the following elements. An antenna module, including a plurality of first antennas and a plurality of second antennas, has the first antennas operating in a first frequency band and a second frequency band, and the second antennas operate in the second frequency band. A performance evaluation module, for evaluating a communication quality between each of the first antennas and a base station in the first frequency band, and marking a base station region, the base station region is related to the base station. A decision module, for selecting one of the first antennas as a transmitting (TX) antenna for an uplink communication of the first frequency band according to the communication quality, and selecting two of the second antennas as two TX antennas for an uplink communication of the second frequency band according to the base station region.

20 Claims, 10 Drawing Sheets

COMMUNICATION DEVICE HAVING MULTIPLE ANTENNAS, AND ALLOCATION METHOD FOR THE ANTENNAS THEREOF

This application claims the benefit of Taiwan application Serial No. 112119341, filed May 24, 2023, the subject matter of which is incorporated herein by reference.

TECHNICAL FIELD

The present disclosure relates to a communication device and an allocation method thereof; in particular, it relates to a communication device with multiple antennas and an allocation method for the antennas thereof.

BACKGROUND

A communication device with multiple antennas (for example, a customer premise equipment (CPE)) may be used to execute a multi-input multi-output (MIMO) communication function. When the positions of the antennas of the communication device are fixed, the position of the transmitting (TX) antennas for an uplink communication may not be arbitrarily selected.

Moreover, when a user of the terminal sets up the communication device, the user may not know the position and direction of the base station near the communication device in advance. Therefore, it will take a long time for the communication device to establish a connection with the base station for uplink communication, and it may even fail to establish the connection with the base station. Even if a connection may be established with the base station, after the connection is established, due to the fixed position of the TX antenna for the uplink communication, the receiving (RX) antenna for a downlink communication of the communication device may not achieve optimal receiving performance.

Based on the above-mentioned technical problems, a communication device with multiple antennas must have an adaptive antenna configuration, which may adaptively allocate the antenna configuration in response to base stations in different positions and directions, so as to achieve the best performance for the TX antennas and the RX antennas.

SUMMARY

According to an aspect of the present disclosure, providing a communication device with multiple antennas includes an antenna module, a performance evaluation module, and a decision module. An antenna module, including a plurality of first antennas and a plurality of second antennas, the first antennas operate in a first frequency band and a second frequency band, and the second antennas operate in the second frequency band. A performance evaluation module, for evaluating a communication quality between each of the first antennas and a base station in the first frequency band, and marking a base station region, the base station region is related to the base station. A decision module, for selecting one of the first antennas as a transmitting (TX) antenna for an uplink communication of the first frequency band according to the communication quality, and selecting two of the second antennas as two TX antennas for an uplink communication of the second frequency band according to the base station region.

According to another aspect of the present disclosure, providing an allocation method for antennas, applied to a communication device with multiple antennas, the communication device includes an antenna module, and the antenna module includes a plurality of first antennas and a plurality of second antennas, the first antennas operate in a first frequency band and a second frequency band, and the second antennas operate in the second frequency band, and the allocation method includes the following steps. Evaluating a communication quality between each of the first antennas and a base station in the first frequency band. Marking a base station region, the base station region is related to the base station. Selecting one of the first antennas as a transmitting (TX) antenna for an uplink communication of the first frequency band according to the communication quality. Selecting two of the second antennas as two TX antennas for an uplink communication of the second frequency band according to the base station region.

Figure 1A:
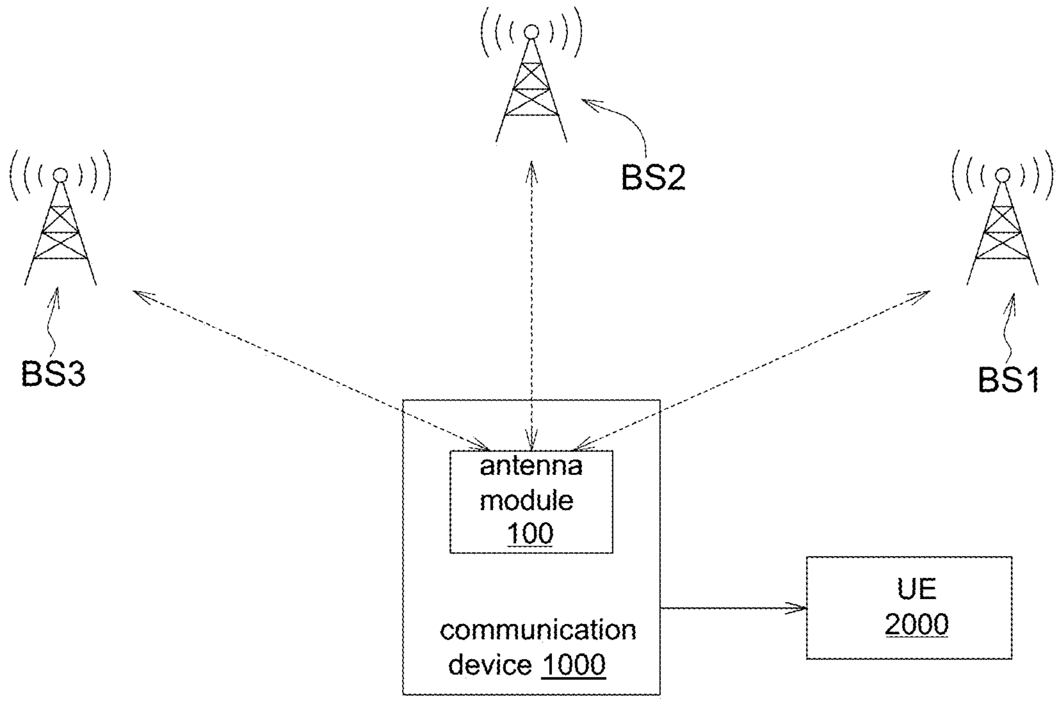
FIG. 1A is a schematic diagram illustrating the operation of a communication device according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawing.

DETAILED DESCRIPTION

FIG. 1A is a schematic diagram illustrating the operation of a communication device 1000 according to an embodiment of the present disclosure. As shown in FIG. 1A, the communication device 1000 is, for example, a customer premise equipment (CPE). The communication device 1000 is used to convert a signal of a mobile communication system (e.g., a 4G-LTE communication system or a 5G-NR communication system) or a wired broadband communication system into a signal of a local area network (LAN) signal, and the converted signal is provided to a user equipment (UE) 2000.

In this embodiment, the communication device 1000 is a smart multi-antenna device, and the antenna module 100 of the communication device 1000 comprises a plurality of antennas for transmitting and receiving signals of the base stations BS1-BS3 of the mobile communication system. In response to the respective positions and directions of different base stations BS1-BS3, the communication device 1000 may intelligently allocate the configuration of the antenna module 100, so as to quickly establish connections with the base stations BS1-BS3 in different directions and positions, and adaptively select suitable TX antennas for the uplink communication and RX antennas for the downlink communication, such that the communication device 1000 and different base stations BS1~BS3 may have the best communication quality.

Figure 1B:
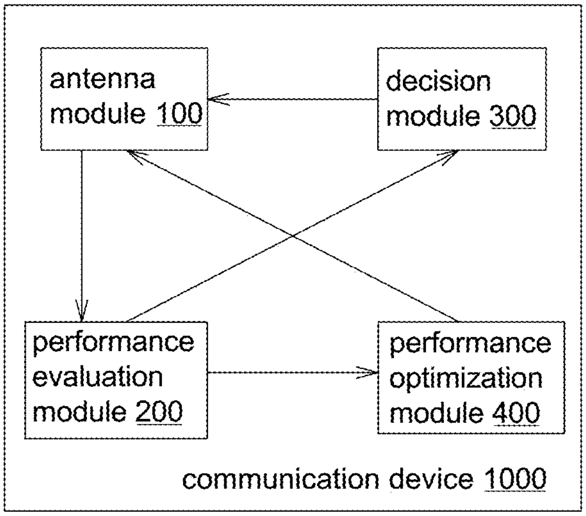
FIG. 1B is a functional block diagram of a communication device according to an embodiment of the present disclosure.

FIG. 1B is a functional block diagram of a communication device 1000 according to an embodiment of the present disclosure. As shown in FIG. 1B, the communication device 1000 includes an antenna module 100, a performance evaluation module 200, a decision module 300, and a performance optimization module 400. According to the multi-antenna configuration of the communication device 1000, the antenna module 100 includes a plurality of antennas to perform a multi-input multi-output (MIMO) communication function.

The performance evaluation module 200 is coupled to the antenna module 100. In response to base stations in different directions and positions, the performance evaluation module 200 analyzes a signal strength and a signal quality of the base station signals received by each antenna of the antenna module 100, so as to evaluate communication quality between each antenna of the antenna module 100 and each base station, and then evaluate a receiving performance of the antenna module 100. In one example, the performance evaluation module 200 analyzes the reference signal received power (RSRP) and the reference signal received quality (RSRQ) of each antenna of the antenna module 100, so as to evaluate the receiving performance of the antenna module 100.

The decision module 300 is coupled to the performance evaluation module 200 and the antenna module 100. In response to base stations in different directions and positions, according to the communication quality of each antenna of the antenna module 100 evaluated by the performance evaluation module 200, the decision module 300 selects one or more suitable antennas from the antenna module 100 as TX antennas for uplink communication for low-band (LB) to mid-band (MB) and TX antennas for uplink communication for high-band (HB) to ultra-high-band (UHB). Moreover, the decision module 300 also selects the RX antennas from antenna module 100 for the downlink communication for LB, MB, HB, and UHB.

The performance optimization module 400 is coupled to the performance evaluation module 200 and the antenna module 100. When the performance evaluation module 200 evaluates that the receiving performance of the antenna module 100 drops significantly, the performance optimization module 400 controls the antenna module 100 to re-allocate to recover the receiving performance of the antenna module 100.

Figure 2A:
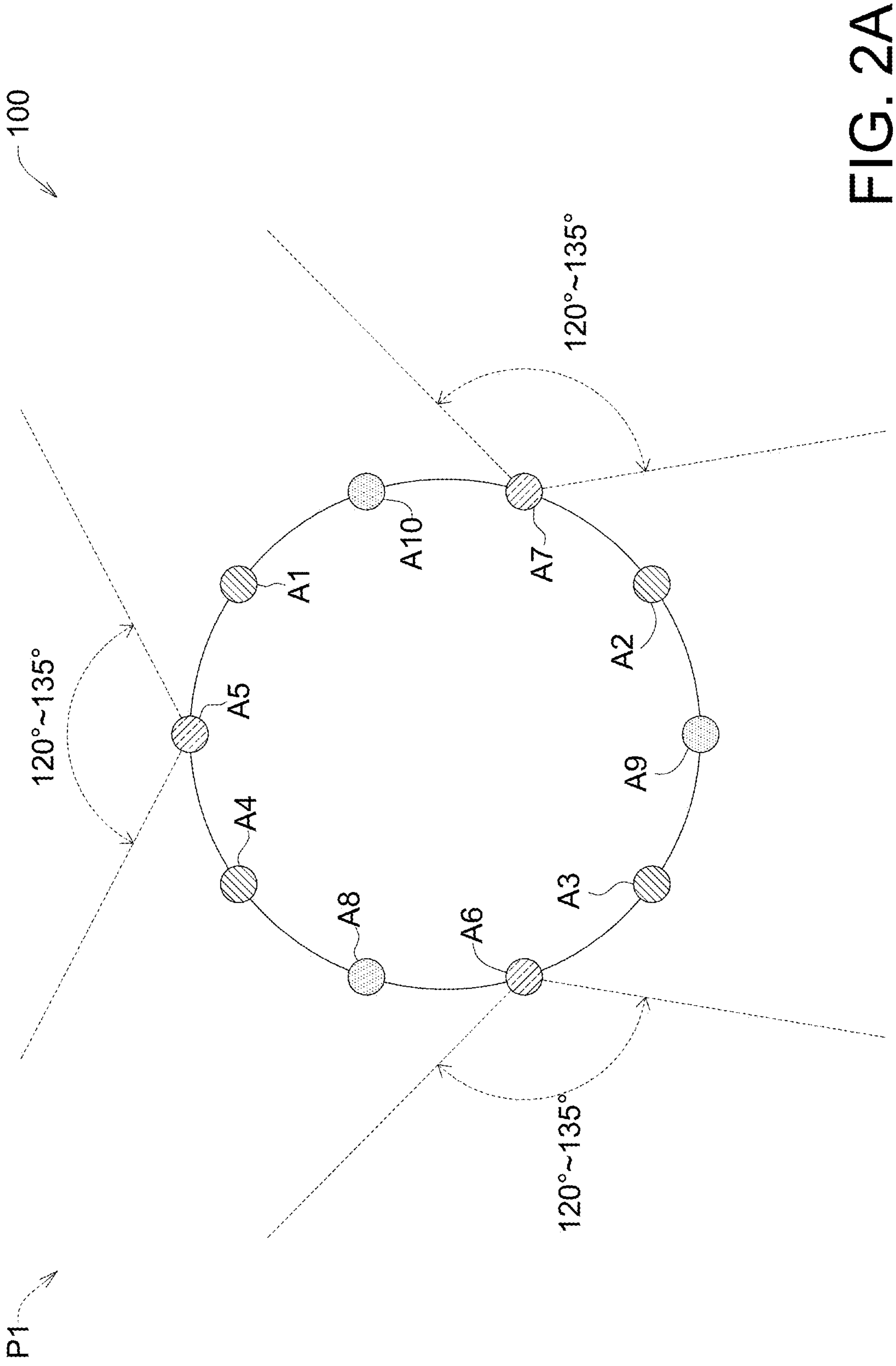
FIGS. 2A and 2B are schematic diagrams of the antenna module according to an embodiment of the present disclosure.
Figure 2B:
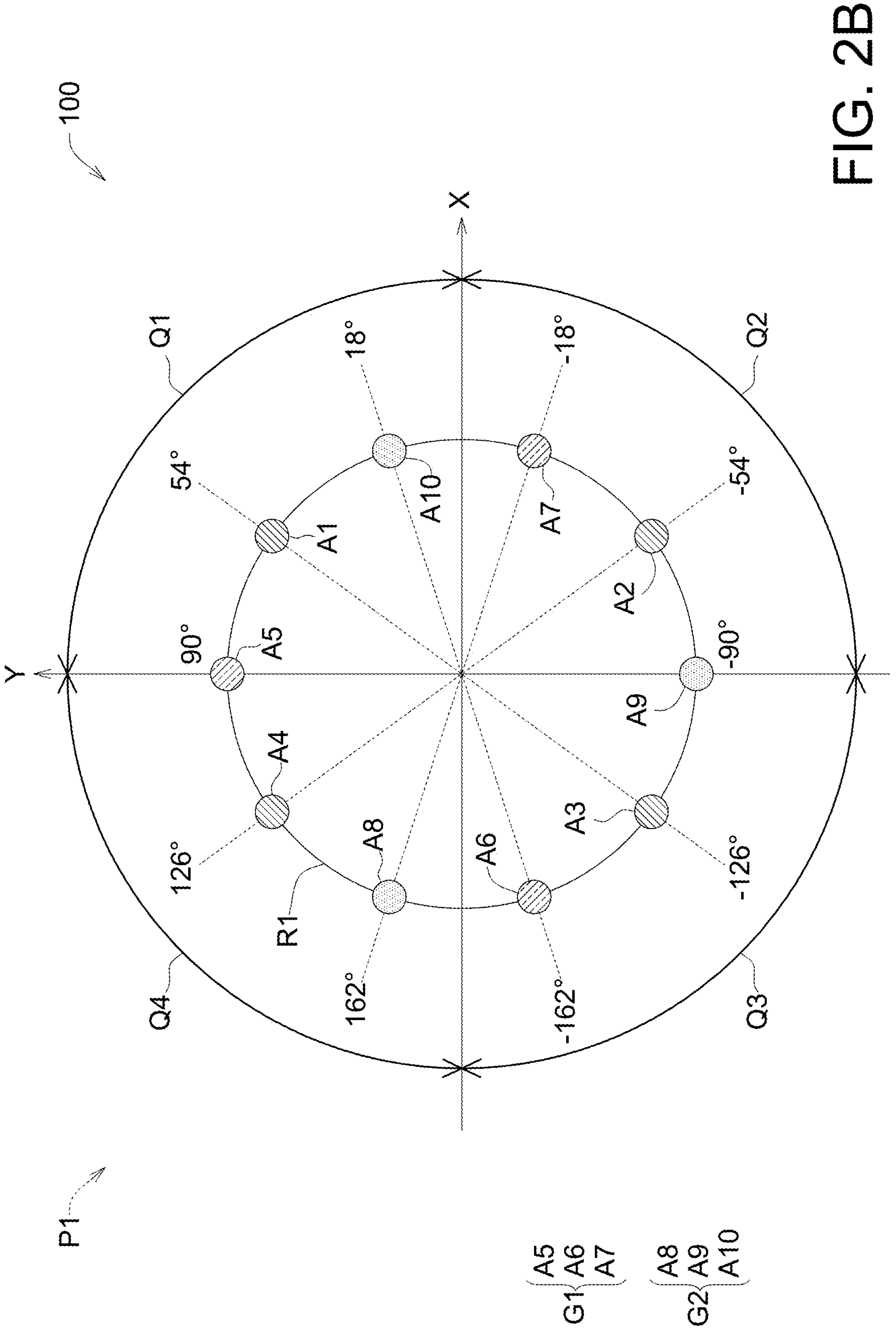

FIGS. 2A and 2B are schematic diagrams of the antenna module 100 according to an embodiment of the present disclosure. According to the multi-antenna configuration of the communication device 1000, the antenna module 100 comprises a plurality of antennas, for example, a first number of first antennas A1-A4 and a second number of second antennas A5-A10. More specifically, FIGS. 2A and 2B are top views according to a normal direction of the first plane P1, which depicts the distribution of the first antennas A1-A4 and the second antennas A5-A10 on the first plane P1. In this embodiment, the first number is, e.g., "4", and the second number is, e.g., "6". That is, the antenna module 100 comprises four first antennas A1-A4 and six second antennas A5-A10.

Each of the first antennas A1-A4 may operate in the first frequency band F1 and the second frequency band F2. The first frequency band F1 ranges from the LB to the MB, for example, covering a frequency band of 400 Hz to 2170 MHz. The second frequency band F2 ranges from the HB to the UHB, for example, covering a frequency band of 3 GHz to 5 GHz. On the other hand, each of the second antennas A5-A10 may operate in the second frequency band F2.

The directivity of an antenna may be described by the radiation pattern of the antenna. The antenna may be, for example, an omni-directional antenna, and its electromagnetic field radiation direction is substantially uniform in all directions of 360 degrees in a plane (such as, the first plane P1 in FIGS. 2A and 2B). On the other hand, the antenna may be, for example, a directional antenna, and the directional antenna includes an uni-directional antenna and a semi-directional antenna.

The uni-directional antenna focuses the radio frequency energy to a specific direction, according to its electromagnetic field radiation direction, furthermore, the gain of the directional antenna correspondingly increases, the antenna coverage distance increases, and the effective coverage angle decreases (in one embodiment, the effective coverage angle may be defined as the angular difference between the two half-power points in the radiation pattern).

The effective coverage angle of the electromagnetic field radiation of the semi-directional antenna is greater than that of the uni-directional antenna. Since the semi-directional antenna has a larger coverage angle, only a small number of semi-directional antennas are needed to cover each direction of 360 degrees in a plane. In contrast, if a combination of uni-directional antennas is utilized, a large number of uni-directional antennas are required to cover each direction of 360 degrees in a plane.

In one embodiment, each of the first antennas A1-A4 and the second antennas A5-A10 is, for example, a uni-directional antenna. In another embodiment, each of the first antennas A1-A4 and the second antennas A5-A10 is, for example, a semi-directional antenna. When each of the first antennas A1-A4 and the second antennas A5-A10 is a semi-directional antenna, as shown in FIG. 2A, the first antennas A1-A4 and the second antennas A5-A10 each has an effective coverage angle ranging from, for example, 120 degrees to 135 degrees. Alternatively, in yet another embodiment, the effective coverage angle of each of the first antennas A1-A4 and the second antennas A5-A10 may be substantially equal to 120 degrees.

Next, please refer to FIG. 2B. The first antennas A1-A4 and the second antennas A5-A10 are allocated on the first plane P1, and the first antennas A1-A4 and the second antennas A5-A10 are distributed on the circular position R1 of the first plane P1. The first plane P1 is divided into a first quadrant Q1, a second quadrant Q2, a third quadrant Q3, and a fourth quadrant Q4 according to the first axis X and the second axis Y. The first antenna A1 is allocated in the first quadrant Q1, the first antenna A2 is allocated in the second quadrant Q2, the first antenna A3 is allocated in the third quadrant Q3, and the first antenna A4 is allocated in the fourth quadrant Q4. More specifically, the first antenna A1 is allocated in a direction with an angle of 54 degrees with respect to the first axis X, the first antenna A2 is allocated in a direction with an angle of −54 degrees with respect to the first axis X, and the first antenna A3 is allocated in a direction with an angle of −126 degrees with respect to the first axis X, and the first antenna A4 is allocated in a direction with an angle of 126 degrees with respect to the first axis X.

On the other hand, the second antennas A5-A10 include two groups, the first group G1 includes three second antennas A5-A7, and the second group G2 includes three second antennas A8-A10. In the first group G1, the second antenna A5 is allocated in the positive direction of the second axis Y, the second antenna A7 is allocated in the second quadrant Q2, and the second antenna A6 is allocated in the third quadrant Q3. In the second group G2, the second antenna A9 is allocated in the negative direction of the second axis Y, the second antenna A10 is allocated in the first quadrant Q1, and the second antenna A8 is allocated in the fourth quadrant Q4. More specifically, in the first group G1, the second antenna A5 is allocated in a direction with an angle of 90 degrees with respect to the first axis X, the second antenna A6 is allocated in a direction with an angle of −162 degrees with respect to the first axis X, and the second antenna A7 is allocated in a direction with an angle of −18 degrees with respect to the first axis X. On the other hand, in the second group G2, the second antenna A8 is allocated in a direction with an angle of 162 degrees with respect to the first axis X, the second antenna A9 is allocated in a direction with an angle of −90 degrees with respect to the first axis X, and the second antenna A10 is allocated in a direction with an angle of 18 degrees with respect to the first axis X. According to the above allocation, any adjacent two of the first antennas A1-A4 and the second antennas A5-A10 have an equal angle of 36 degrees. That is, the first antennas A1-A4 and the second antennas A5-A10 are uniformly distributed on the circular position R1 of the first plane P1.

Moreover, any two of the first antennas A1-A4 are not adjacent to each other, any two of the second antennas A5-A7 of the first group G1 are not adjacent to each other, and any two of the second antennas A8-A10 of the second group G2 are not adjacent to each other. That is, the first antennas A1-A4 and the second antennas A5-A10 are allocated alternately at the circular position R1 of the first plane P1. In this embodiment, the second antenna A7 of the first group G1 and the second antenna A10 of the second group G2 are allocated between the first antenna A1 and the first antenna A2. The second antenna A9 of the second group G2 is allocated between the first antenna A2 and the first antenna A3. The second antenna A6 of the first group G1 and the second antenna A8 of the second group G2 are allocated between the first antenna A3 and the first antenna A4. The second antenna A5 of the first group G1 is allocated between the first antenna A4 and the first antenna A1. The allocating positions of the second antennas A5, A6 and A7 of the first group G1 may mirror to the allocating positions of the second antennas A9, A8 and A10 of the second group G2 according to the first axis X.

Figure 3A:
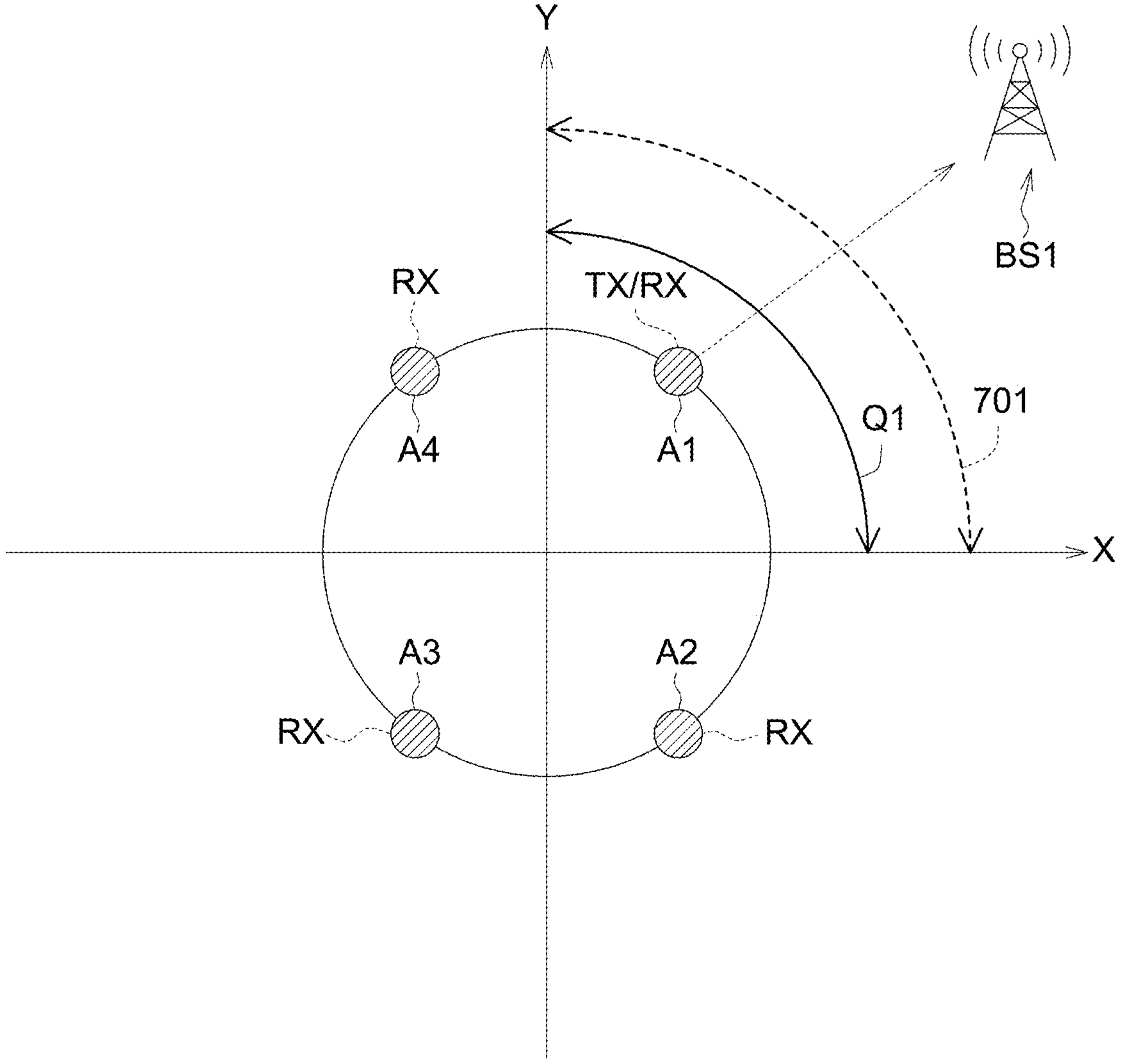
FIGS. 3A-3C are schematic diagrams illustrating adaptively allocating the first antennas as the TX antennas and/or RX antennas for the first frequency band in response to different base stations.
Figure 3B:
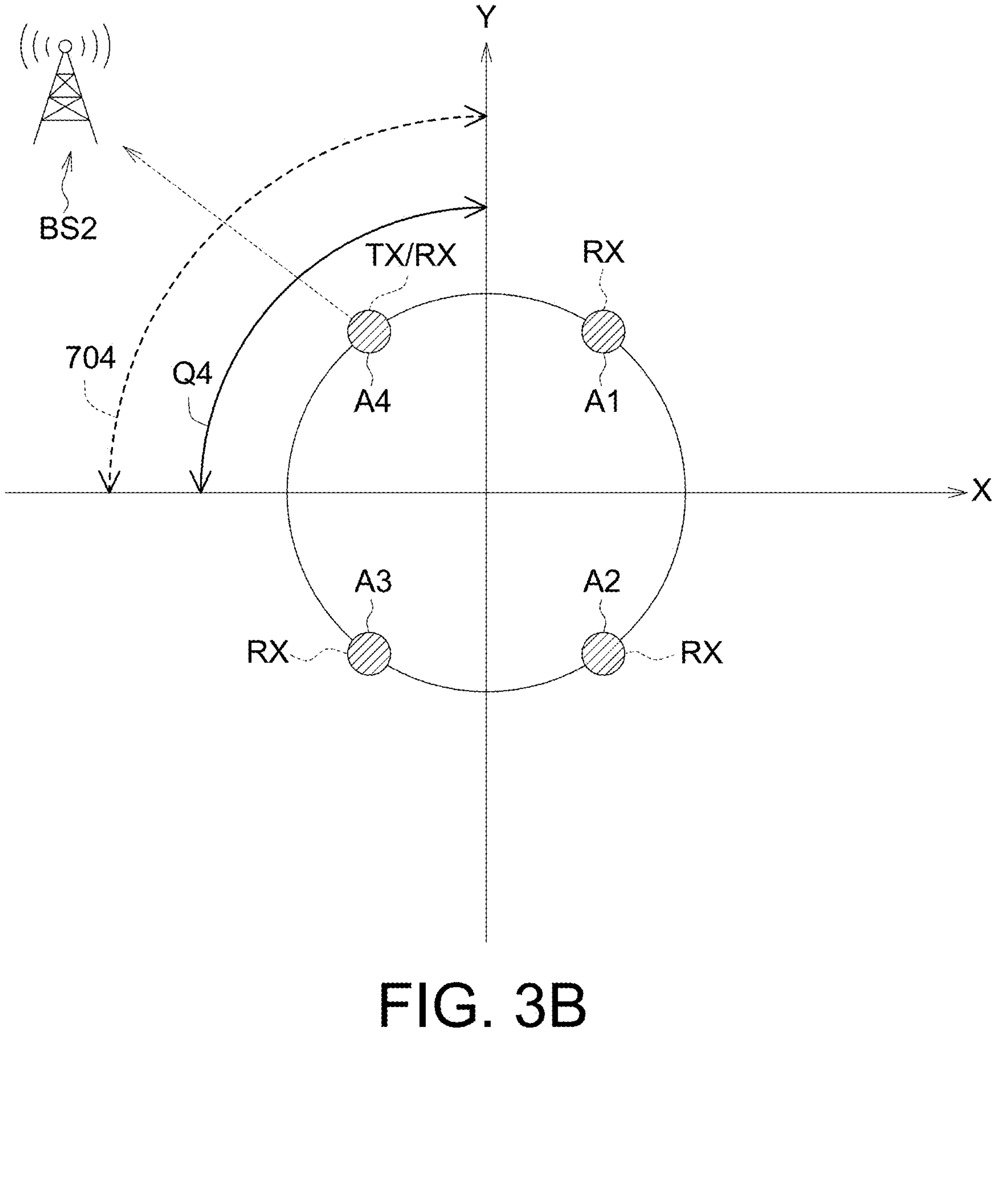
Figure 3C:
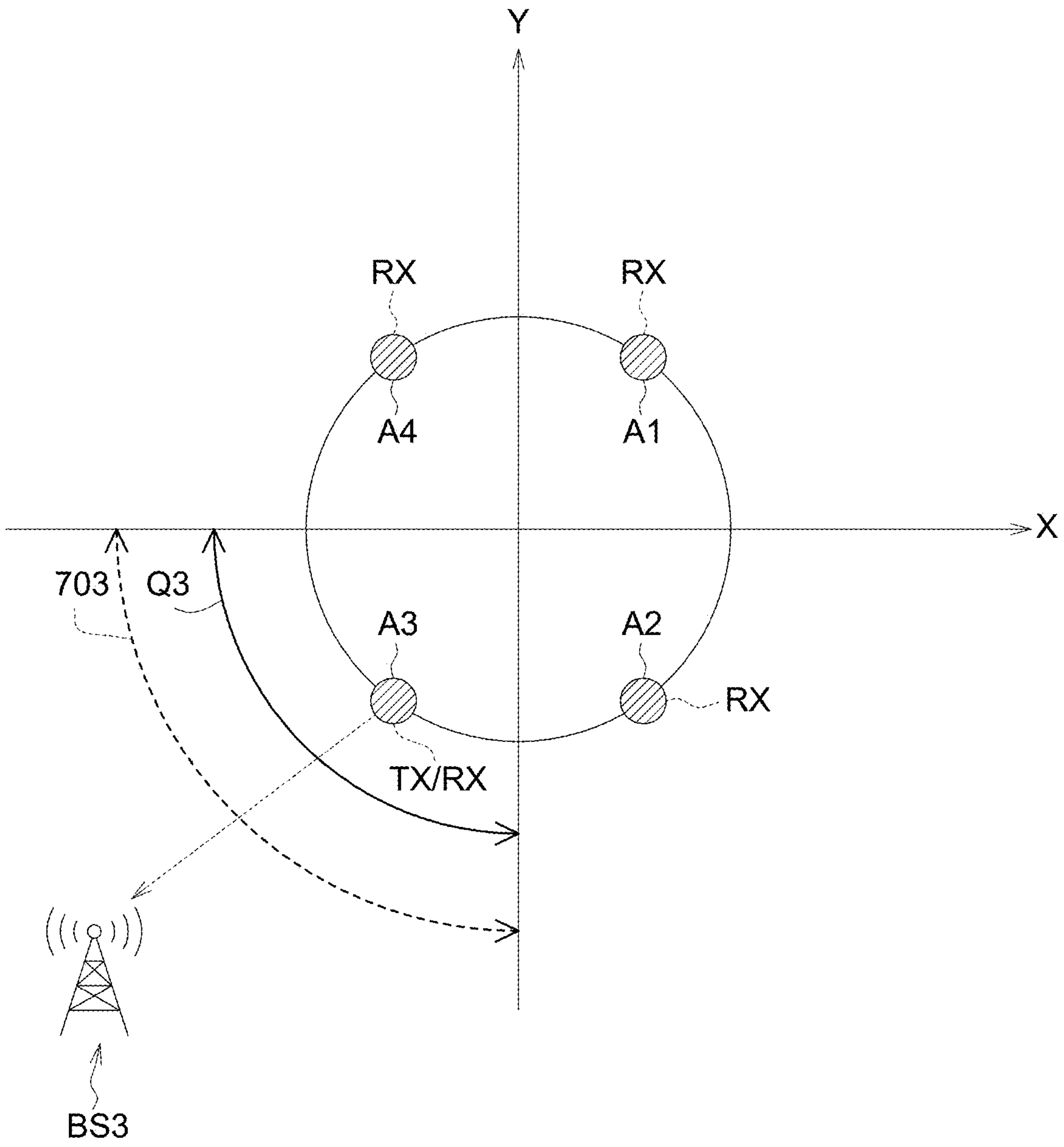

FIGS. 3A-3C are schematic diagrams illustrating adaptively allocating the first antennas A1-A4 as the TX antennas and/or RX antennas for the first frequency band F1 in response to different base stations BS1-BS3. Referring to FIG. 3A first, this embodiment shows that, in response to the base station BS1, each of the first antennas A1-A4 operates in the first frequency band F1 to receive the broadcast information (e.g., SSB sequence) of base station BS1 in LB or MB. The performance evaluation module 200 analyzes the signal strength and signal quality of the broadcast information received by the first antennas A1-A4, so as to evaluate the communication quality between the first antennas A1-A4 and the base station BS1 in the first frequency band F1.

The direction of the first antenna A1 allocated in the first quadrant Q1 best fits the position and direction of the base station BS1, and the signal strength and signal quality of the broadcast information of the base station BS1 received by the first antenna A1 are the best. Therefore, the performance evaluation module 200 marks a region corresponding to the first quadrant Q1 as a base station region 701, and the base station region 701 is associated with the base station BS1.

According to the communication quality between the first antennas A1-A4 and the base station BS1 in the first frequency band F1 and the marked base station region 701, the decision module 300 is used to select the first antenna A1 of the first quadrant Q1 as the TX antenna for uplink communication of the first frequency band F1, and to establish a connection with the base station BS1 for uplink communication, through the first antenna A1. The first antenna A1 is also used as a RX antenna for the downlink communication in the first frequency band F1. On the other hand, the other three first antennas A2-A4 also serve as RX antennas for the downlink communication in the first frequency band F1. The first antennas A1-A4 form a "1T4R" configuration (i.e., 1-TX and 4-RX) for the first frequency band F1, which includes one TX antenna (i.e., the first antenna A1) and four RX antennas (i.e., the first antennas A1-A4).

On the other hand, referring to FIG. 3B, the embodiment in FIG. 3B corresponds to another base station BS2. The directivity of the first antenna A4 allocated in the fourth quadrant Q4 best fits the position and direction of the base station BS2, and the performance evaluation module 200 marks the region corresponding to the fourth quadrant Q4 as the base station region 704, which is associated with the base station BS2. The decision module 300 selects the first antenna A4 in the fourth quadrant Q4 as the TX antenna for uplink communication and the RX antenna for downlink communication in the first frequency band F1. On the other hand, the other three first antennas A1, A2 and A3 are also allocated as RX antennas for the downlink communication of the first frequency band F1, which forms a "1T4R" configuration of the first frequency band F1. The "1T4R" configuration of the embodiment in FIG. 3B includes one TX antenna (i.e., the first antenna A4) and four RX antennas (i.e., the first antennas A1-A4).

Next, referring to FIG. 3C, the embodiment in FIG. 3C corresponds to another base station BS3. The directivity of the first antenna A3 allocated in the third quadrant Q3 best fits the position and direction of the base station BS3, and the performance evaluation module 200 marks the region corresponding to the third quadrant Q3 as the base station region 703, which is associated with the base station BS3. The decision module 300 selects the first antenna A3 of the third quadrant Q3 as the TX antenna for the uplink communication of the first frequency band F1, and establishes a connection of an uplink communication with the base station BS3, through the first antenna A3. All the first antennas A1-A4 are allocated as RX antennas for downlink communication in the first frequency band F1. According to the above allocation, the "1T4R" configuration of the first frequency band F1 is formed, which includes one TX antenna (i.e., the first antenna A3) and four RX antennas (i.e., the first antennas A1-A4).

In the embodiments shown in FIGS. 3A-3C, in response to base stations BS1-BS3 of different directions and positions, the decision module 300 selects one from the first antennas A1-A4 as the TX antennas for the uplink communication of the first frequency band F1, and all the first antennas A1-A4 are allocated as RX antennas for the downlink communication of the first frequency band F1, which forms a "1T4R" configuration of the first frequency band F1.

Figure 4A:
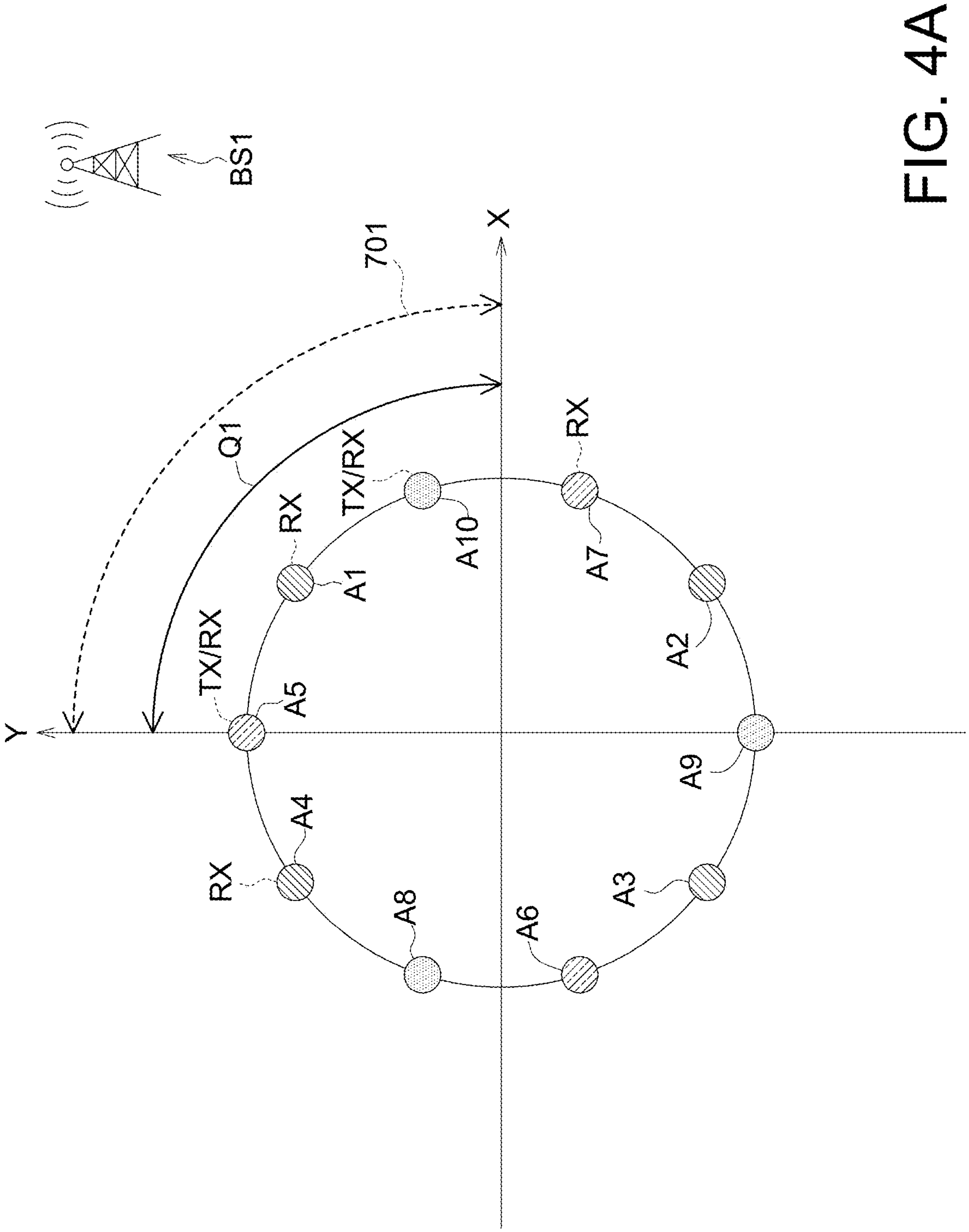
FIGS. 4A-4C are schematic diagrams showing adaptively allocating the first antennas and the second antennas as the TX antennas and/or RX antennas of the second frequency band in response to different base stations.
Figure 4B:
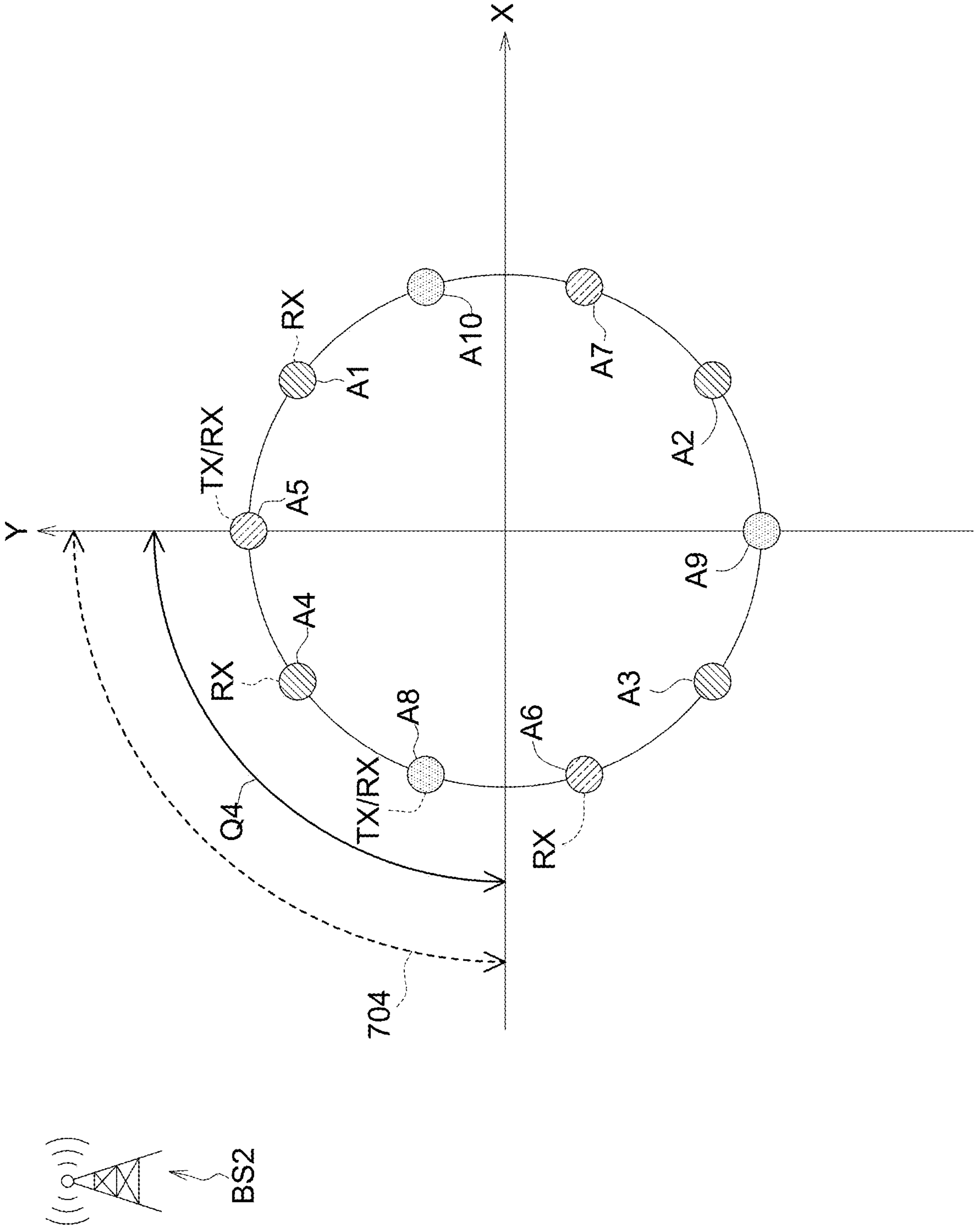
Figure 4C:
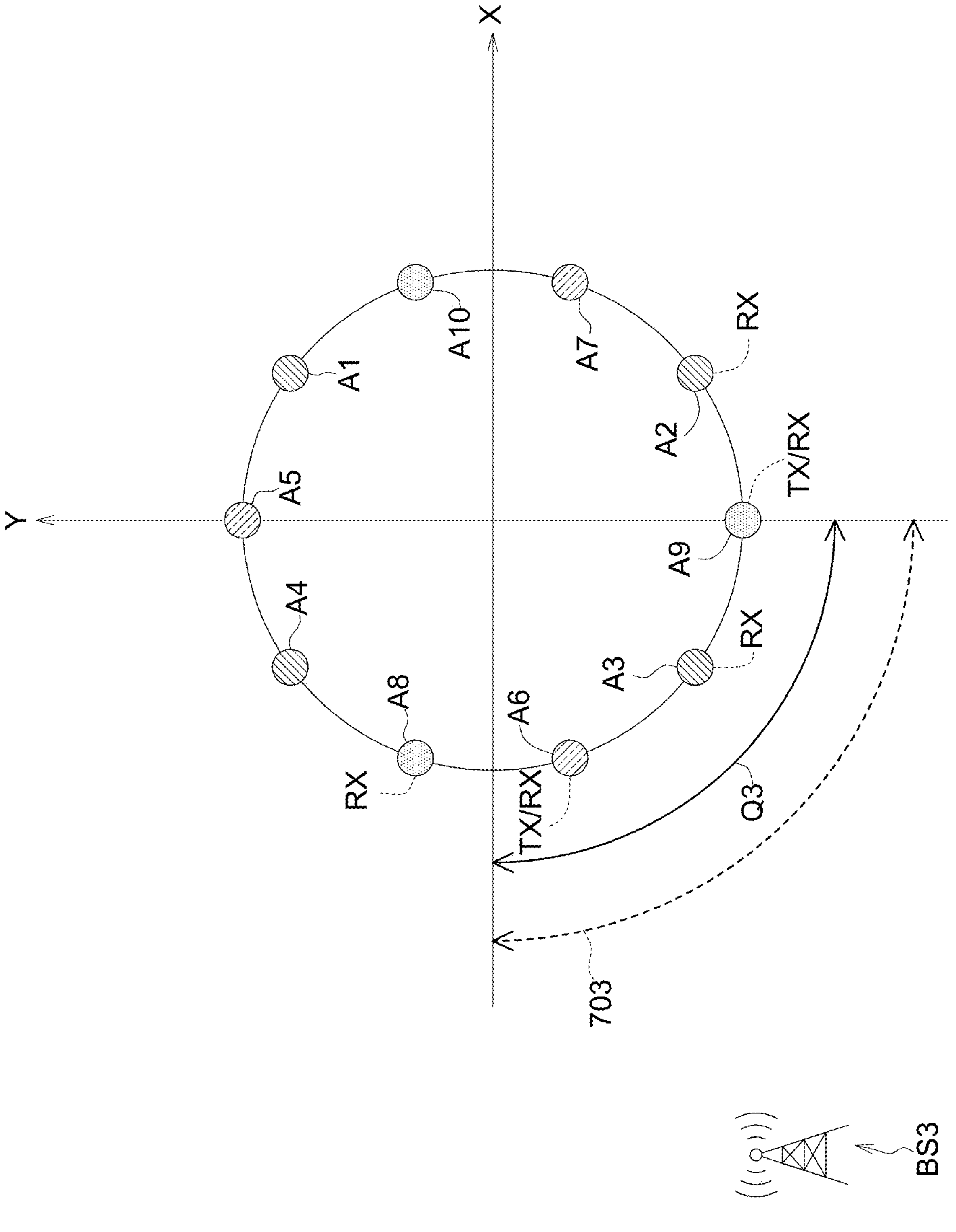

FIGS. 4A-4C are schematic diagrams showing adaptively allocating the first antennas A1-A4 and the second antennas A5-A10 as the TX antennas and/or RX antennas of the second frequency band F2 in response to different base stations BS1-BS3. The performance evaluation module 200 marks base station regions according to the communication quality of the base stations BS1-BS3. According to the marked base station region, the decision module 300 selects two of the second antennas A5-A10 as the TX antennas for the uplink communication of the second frequency band F2.

Please refer to FIG. 4A first, the embodiment in FIG. 4A corresponds to the base station BS1. The decision module 300 marks the region corresponding to the first quadrant Q1 as the base station region 701, and the base station region 701 is related to the base station BS1. The decision module 300 selects two of the second antennas A5-A10 which are mostly related to the base station region 701, as the TX antennas for uplink communication in the second frequency band F2. The selected two of the second antennas A5-A10 belong to the first group G1 and the second group G2 respectively. That is, the decision module 300 selects one antenna from the first group G1 and one antenna from the second group G2 as two TX antenna for the uplink communication of the second frequency band F2. In the embodiment of FIG. 4A, the second antenna A5 of the first group G1 and the second antenna A10 of the second group G2 are most related to the base station region 701, and the second antennas A5 and A10 are selected as two TX antenna for the uplink communication of the second frequency band F2. The second antennas A5 and A10 are also used as RX antennas for the downlink communication of the second frequency band F2.

Moreover, the decision module 300 selects the first antenna A4 and A1, which are adjacent to the second antenna A5, as the RX antenna for the downlink communication of the second frequency band F2, to form a "2T4R" configuration of the second frequency band F2. The "2T4R" configuration includes two TX antennas (i.e., the second antennas A5 and A10) and four RX antennas (i.e., the second antennas A5 and A10 and the first antennas A4 and A1).

In another example, the decision module 300 selects the first antenna A1 and the second antenna A7, which are adjacent to the second antenna A10, as RX antennas for the downlink communication of the second frequency band F2. Accordingly, the "2T4R" configuration of the second frequency band F2 comprises two TX antennas (i.e., the second antennas A5 and A10) and four RX antennas (i.e., the second antennas A5, A7, and A10, and the first Antenna A1).

On the other hand, referring to FIG. 4B, the embodiment in FIG. 4B corresponds to another base station BS2. The decision module 300 marks the region, which corresponds to the fourth quadrant Q4, as the base station region 704, and the base station region 704 is related to the base station BS2. The decision module 300 selects one antenna from the first group G1 and selects one antenna from the second group G2 of the second antennas A5-A10 as two TX antennas for the uplink communication of the second frequency band F2. In the embodiment of FIG. 4B, the second antenna A5 of the first group G1 and the second antenna A8 of the second group G2 are most related to the base station region 704, and the second antennas A5 and A8 are selected as TX antennas for the uplink communication of the second frequency band F2. The second antennas A5 and A8 are also used as RX antennas for the downlink communication of the second frequency band F2.

The decision module 300 further selects the first antenna A4 and A1, which are adjacent to the second antenna A5, as two RX antennas for the downlink communication of the second frequency band F2. The "2T4R" configuration in the embodiment of FIG. 4B comprises two TX antennas (i.e., the second antennas A5 and A8) and four RX antennas (i.e., the second antennas A5 and A8, and the first antenna A4 and A1).

In another example, the first antenna A1 and the second antenna A6, which are adjacent to the second antenna A8, are selected as two RX antennas for downlink communication in the second frequency band F2. Accordingly, the "2T4R" configuration of the second frequency band F2 comprises two TX antennas (i.e., the second antennas A5 and A8) and four RX antennas (i.e., the second antennas A5, A6, and A8, and the first Antenna A4).

Next, referring to FIG. 4C, the embodiment of FIG. 4C corresponds to another base station BS3. The region corresponding to the third quadrant Q3 is marked as the base station region 703, which is associated with the base station BS3. The second antenna A6 of the first group G1 and the second antenna A9 of the second group G2 are most related to the base station region 703, and the second antennas A6 and A9 are selected as two TX antennas of the uplink communication of the second frequency band F2. The second antennas A6 and A9 are also allocated as RX antennas for the downlink communication of the second frequency band F2. Moreover, the first antennas A2 and A3 adjacent to the second antenna A9, are selected as RX antennas for downlink communication of the second frequency band F2. The "2T4R" configuration of the embodiment of FIG. 4C comprises two TX antennas (i.e., the second antennas A6 and A9) and four RX antennas (i.e., the second antennas A6 and A9 and the first antennas A2 and A3).

In another example, the first antenna A3 and the second antenna A8, which are adjacent to the second antenna A6, are selected as RX antennas for downlink communication in the second frequency band F2. Accordingly, the "2T4R" configuration of the second frequency band F2 comprises two TX antennas (i.e., the second antennas A6 and A9) and four RX antennas (i.e., the second antennas A6, A8, and A9 and the first Antenna A3).

Figure 5:
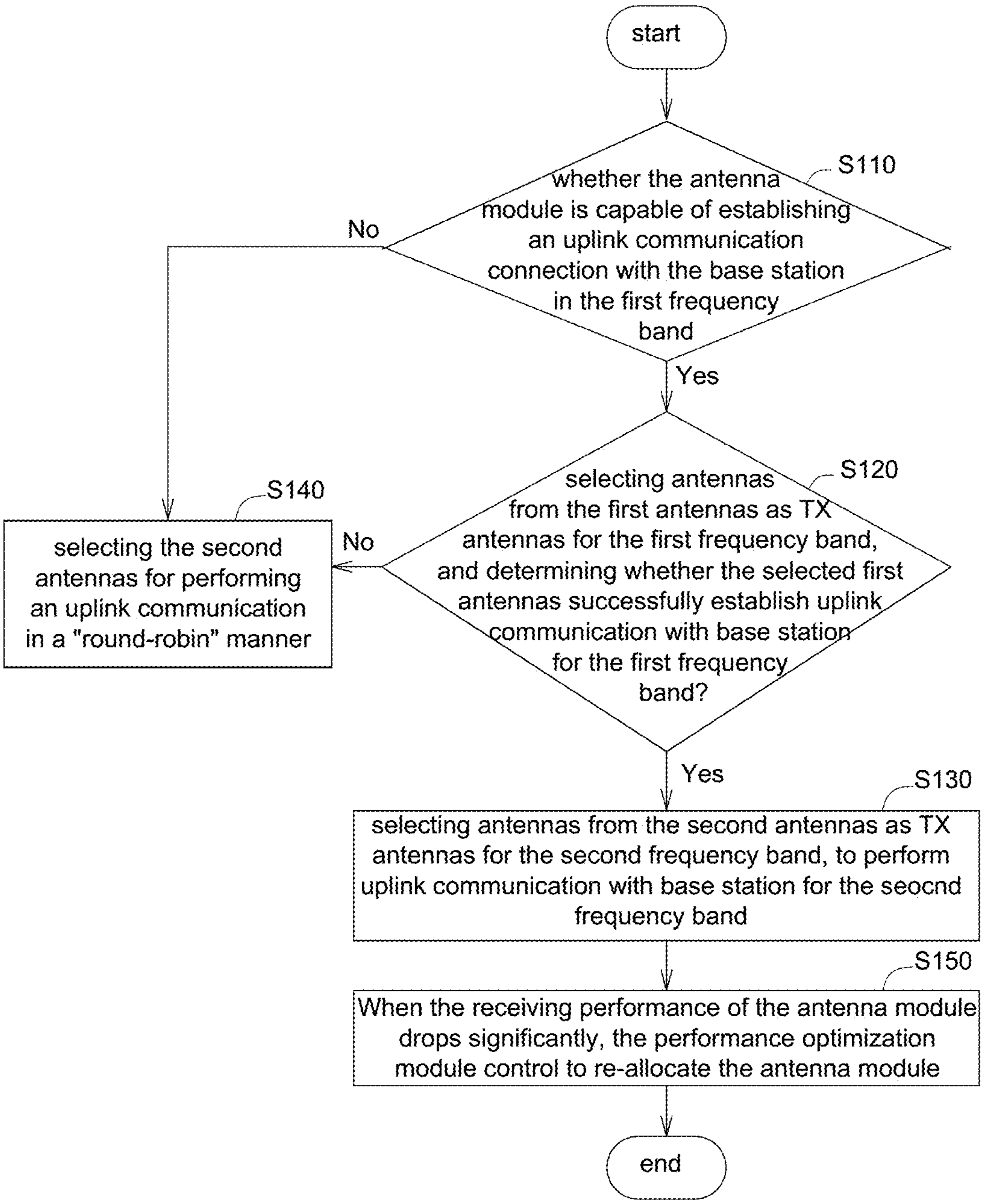
FIG. 5 is a flow diagram of an embodiment of an allocation method for the communication device of the present disclosure.

FIG. 5 is a flow diagram of an embodiment of an allocation method for the communication device 1000 of the present disclosure. The steps of the flow diagram of FIG. 5 correspond to the embodiments in FIGS. 3A-3C and FIGS. 4A-4C. First, in step S110, the communication device 1000 preliminarily determines whether the antenna module 100 is capable of establishing a connection with the base stations BS1-BS3 in the first frequency band F1. That is, preliminarily determining that, whether it is possible to establish an uplink communication connection with the base stations BS1-BS3 in the first frequency band F1 through the first antennas A1-A4. If the determination result is positive (i.e., "Yes"), executing step S120. If the determination result is negative (i.e., "No"), execute step S140.

In step S120, the communication device 1000 selects the most suitable one of the first antennas A1-A4 and one of the base stations BS1-BS3 with the best communication quality to perform uplink communication. More specifically, the communication device 1000 controls each of the first antennas A1-A4 to operate in the first frequency band F1, so as to receive broadcast information of the base stations BS1-BS3 at the LB or MB. The performance evaluation module 200 analyzes the signal strength and signal quality of the broadcast information received by the first antennas A1-A4 in the first frequency band F1, so as to evaluate the communication quality. Furthermore, according to the communication quality of the first antennas A1-A4 and the base stations BS1-BS3, the decision module 300 selects one among the base stations BS1-BS3 with the best communication quality, and selects the most suitable one from the first antenna A1-A4 to establish the uplink communication connection with the selected base station.

In an example of step S120, the performance evaluation module 200 analyzes that, the base station BS1 has the best communication quality in the current environment, and the performance evaluation module 200 marks the base station region 701 according to the position of the base station BS1, and the base station region 701 corresponds to the first quadrant Q1. Moreover, the performance evaluation module 200 analyzes that, the first antenna A1 allocated in the first quadrant Q1 has the best communication quality with the base station BS1, and the decision module 300 selects the first antenna A1 to establish a connection for uplink communication with the base station BS1 in the first frequency band F1. The first antenna A1 serves as the TX antenna of the first frequency band F1 and performs uplink communication with the base station BS1 in the first frequency band F1. Moreover, the first antenna A1 serves as a RX antenna of the first frequency band F1 at the same time. The other first antennas, i.e., the first antennas A2-A4 are also used as RX antennas of the first frequency band F1. The first antennas A1-A4 form a “1T4R” configuration of the first frequency band F1.

At step S120, if it successfully performs uplink communication in the first frequency band F1 with the base station BS1 using the selected first antenna A1, and successfully performs downlink communication in the second frequency band F2 with the base station BS1 using the first antennas A1-A4, then execute step S130.

In step S130, according to the base station BS1 and the first antenna A1 selected in step S120, the communication device 1000 selects two from the second antennas A5-A10 as the TX antenna of the second frequency band F2, which are used to perform uplink communication with the base station BS1 in the second frequency band F2. In one example, according to the base station region 701 corresponding to the base station BS1, the decision module 300 selects two from the second antennas A5-A10, which are most related to the base station region 701, that is, the second antenna A5 of the first group G1 and the second antenna A10 of the second group G2. The second antennas A5 and A10 serve as the TX antennas of the second frequency band F2 for uplink communication with the base station BS1, and the second antennas A5 and A10 also serve as the RX antennas of the second frequency band F2 for downlink communication. Moreover, the decision module 300 further selects the first antenna A4 and A1, which are adjacent to the second antenna A5, as the RX antennas for the downlink communication of the second frequency band F2. The second antennas A5 and A10 and the first antennas A4 and A1 form a “2T4R” configuration of the second frequency band F2. Alternatively, the decision module 300 selects the first antenna A1 and the second antenna A7, which are adjacent to the second antenna A10, as RX antennas for the downlink communication of the second frequency band F2. The second antennas A5, A7 and A10 and the first antenna A1 form a “2T4R” configuration of the second frequency band F2. After step S130, step S150 is performed.

In step S150, the performance evaluation module 200 calculates the spectrum efficiency of each antenna of the “1T4R” configuration of the first frequency band F1 and each antenna of the “2T4R” configuration of the second frequency band F2, so as to evaluate the receiving performance of the antenna module 100. When the performance evaluation module 200 evaluates that the receiving performance of the antenna module 100 drops significantly, the performance optimization module 400 re-allocates the antenna module 100, so as to re-allocate the antennas of the “1T4R” configuration of the first frequency band F1 and/or re-allocate the antennas of the “2T4R” configuration of the second frequency band F2. Receiving performance of the antenna module 100 may thus be recovered.

In one example, when the performance evaluation result of the performance evaluation module 200 shows that, the attenuation of the reference signal received power (RSRP) received by the antenna module 100 is greater than 10 dB, indicating that the receiving performance of the antenna module 100 has dropped significantly, the performance optimization module 400 re-allocates the antennas of the “2T4R” configuration of the second frequency band F2.

In another example, the performance evaluation result of the performance evaluation module 200 shows that, the connection between the antenna module 100 and the base station BS1 is terminated. Then, the performance optimization module 400 re-allocates antennas of the “1T4R” configuration of the first frequency band F1. For example, step S120 is re-executed, evaluating that communication quality of another base station BS2 is better, and marking another base station region 704. Then the performance optimization module 400 selects the first antenna A4 allocated in the fourth quadrant Q4 to connect with the base station BS2 for uplink communication, and the first antenna A4 is used as the TX antenna and the RX antenna of the first frequency band F1. Moreover, the performance optimization module 400 selects the second antennas A5 and A8, which are most related to the base station region 704, as the TX antenna and the RX antenna of the second frequency band F2. Then, selecting the first antennas A1 and A4, which are adjacent to the second antenna A5, as RX antennas for the second frequency band F2.

On the other hand, if the determination result of step S110 is “No”, indicating that the antenna module 100 may merely establish connections with the base stations BS1-BS3 in the second frequency band F2 (i.e., it is only possible to establish uplink communication connections with the base stations BS1-BS3 in the second frequency band F2 through the second antennas A5-A10), and then executing step S140. Alternatively, at step S120, if the uplink communication of the first frequency band F1 is not successfully performed with the base station through one of the first antennas A1-A4, then step S140 is executed.

In step S140, taking the second antennas A5-A10 to receive the HB/UHB broadcast information of the base station BS1-BS3 in the second frequency band F2, and using the performance evaluation module 200 to analyze the received signal strength and signal quality by the second antennas A5-A10. That is, the communication quality of each of the second antennas A5-A10 is evaluated in a “round-robin” manner, so as to select suitable ones from the second antennas A5-A10 for uplink communication. In one example, the base station BS1 in the current environment is related to the base station region 701 of the first quadrant Q1, and the decision module 300 selects the second antennas A5 and A10 which are most related to the base station region 701, from the second antennas A5-A10. Then, step S130 is executed, using the second antennas A5 and A10 as the TX antennas of the second frequency band F2 to perform uplink communication with the base station BS1 in the second frequency band F2.

It will be apparent to those skilled in the art that various modifications and variations may be made to the disclosed embodiments. It is intended that the specification and examples be considered as exemplary only, with a true scope of the disclosure being indicated by the following claims and their equivalents.

What is claimed is:

1. A communication device with multiple antennas, comprising:

an antenna module, comprising a plurality of first antennas and a plurality of second antennas, the first antennas operate in a first frequency band and a second frequency band, and the second antennas operate in the second frequency band, the first antennas and the second antennas are disposed on a circular ring on a first plane which is divided into a plurality of quadrants with respect to a center of the circular ring, and the second antennas are divided into a first group and a second group;

a performance evaluation module, configured to evaluate a communication quality between each of the first antennas and a base station in the first frequency band, and mark one of the quadrants corresponding to the base station as a base station region according to the communication quality; and a decision module, configured to select one of the first antennas as a transmitting (TX) antenna for an uplink communication of the first frequency band according to the communication quality, and select one antenna from the first group of the second antennas and one antenna from the second group of the second antennas as a plurality of TX antennas for an uplink communication of the second frequency band according to the base station region.

2. The communication device according to claim 1, wherein the first frequency band ranges from a low-band (LB) to a mid-band (MB), and the second frequency band ranges from a high-band (HB) to an ultra-high-band (UHB).

3. The communication device according to claim 1, wherein each of the first antennas serves as a receiving (RX) antenna for a downlink communication of the first frequency band, and the decision module is configured to select four of the first antennas and the second antennas as four RX antennas for a downlink communication of the second frequency band according to the base station region.

4. The communication device according to claim 1, wherein the communication quality of each of the first antennas comprises a reference signal received power (RSRP) and a reference signal received quality (RSRQ).

5. The communication device according to claim 1, wherein the first antennas and the second antennas are uniformly distributed on positions with respect to the circular ring on the first plane, and there is an equal angle between any adjacent two of the first antennas and the second antennas.

6. The communication device according to claim 5, wherein the second antennas comprise a first group and a second group, and the amount of the second antennas of the first group is equal to the amount of the second antennas of the second group.

7. The communication device according to claim 6, wherein any two of the second antennas of the first group are not adjacent to each other, any two of the second antennas of the second group are not adjacent to each other, and any two of the first antennas are not adjacent to each other.

8. The communication device according to claim 1, further comprising:

a performance optimization module, configured to reselect the TX antennas for the uplink communication of the first frequency band and the second frequency band from the first antennas and the second antennas, according to a receiving performance of the antenna module.

9. The communication device according to claim 1, wherein each of the first antennas and the second antennas is a directional antenna, and the communication device is a customer premise equipment (CPE), the communication device is used to convert a signal of a mobile communication system into a signal of a local area network (LAN).

10. The communication device according to claim 9, wherein an effective coverage angle of each of the first antennas and the second antennas is between 120 degrees and 135 degrees.

11. An allocation method for antennas, applied to a communication device with multiple antennas, the communication device comprises an antenna module, and the antenna module comprises a plurality of first antennas and a plurality of second antennas, the first antennas operate in a first frequency band and a second frequency band, and the second antennas operate in the second frequency band, the first antennas and the second antennas are disposed on a circular ring on a first plane which is divided into a plurality of quadrants with respect to a center of the circular ring, and the second antennas are divided into a first group and a second group, and the allocation method comprising:

evaluating a communication quality between each of the first antennas and a base station in the first frequency band;

marking one of the quadrants corresponding to the base station as a base station region according to the communication quality;

selecting one of the first antennas as a transmitting (TX) antenna for an uplink communication of the first frequency band according to the communication quality; and selecting one antenna from the first group of the second antennas and one antenna from the second group of the second antennas as a plurality of TX antennas for an uplink communication of the second frequency band according to the base station region.

12. The allocation method according to claim 11, wherein the first frequency band ranges from a low-band (LB) to a mid-band (MB), and the second frequency band ranges from a high-band (HB) to an ultra-high-band (UHB).

13. The allocation method according to claim 11, further comprising:

allocating each of the first antennas as a receiving (RX) antenna for a downlink communication of the first frequency band; and selecting four of the first antennas and the second antennas as four RX antennas for a downlink communication of the second frequency band according to the base station region.

14. The allocation method according to claim 11, wherein the communication quality of each of the first antennas comprises a reference signal received power (RSRP) and a reference signal received quality (RSRQ).

15. The allocation method according to claim 11, wherein the first antennas and the second antennas are uniformly distributed on positions with respect to the circular ring on the first plane, and there is an equal angle between any adjacent two of the first antennas and the second antennas.

16. The allocation method according to claim 15, wherein the second antennas comprise a first group and a second group, and the number of the second antennas of the first group is equal to the number of the second antennas of the second group.

17. The allocation method according to claim 16, wherein any two of the second antennas of the first group are not adjacent to each other, any two of the second antennas of the second group are not adjacent to each other, and any two of the first antennas are not adjacent to each other.

18. The allocation method according to claim 11, further comprising:

re-selecting the TX antennas for the uplink communication of the first frequency band and the second frequency band from the first antennas and the second antennas, according to a receiving performance of the antenna module.

19. The allocation method according to claim 11, wherein each of the first antennas and the second antennas is a directional antenna, and the communication device is a customer premise equipment (CPE), the communication device is used to convert a signal of a mobile communication system into a signal of a local area network (LAN).

20. The allocation method according to claim 11, wherein an effective coverage angle of each of the first antennas and the second antennas is between 120 degrees and 135 degrees.

* * * * *